United States Patent

Shiro et al.

[11] Patent Number: 5,958,305
[45] Date of Patent: Sep. 28, 1999

[54] FILM OF AROMATIC POLYETHERSULFONE, PROCESS FOR THE PRODUCTION THEREOF, AND SOLUTION COMPOSITION FOR THE PRODUCTION THEREOF

[75] Inventors: Takashi Shiro; Kaoru Iwata; Hideaki Nitta; Takeshi Sasaki; Utami Yonemura, all of Hino, Japan

[73] Assignee: Teijin Limited, Osaka, Japan

[21] Appl. No.: 09/022,545

[22] Filed: Feb. 12, 1998

Related U.S. Application Data

[62] Division of application No. 08/792,219, Jan. 31, 1997, Pat. No. 5,759,449, which is a division of application No. 08/415,136, Mar. 30, 1995, Pat. No. 5,645,766.

[51] Int. Cl.$^6$ .................................. F21V 9/14; C08J 5/15
[52] U.S. Cl. ..................... 252/585; 252/582; 524/108; 345/87
[58] Field of Search .................... 252/582, 585; 524/108; 345/87, 94; 264/291

[56] References Cited

U.S. PATENT DOCUMENTS

| | | | |
|---|---|---|---|
| 4,065,437 | 12/1977 | Blinne et al. | 260/49 |
| 4,156,068 | 5/1979 | Hartmann . | |
| 5,611,985 | 3/1997 | Kobayashi et al. | 524/108 |

FOREIGN PATENT DOCUMENTS

| | | |
|---|---|---|
| 338575 | 10/1989 | European Pat. Off. . |
| 0365916 | 5/1990 | European Pat. Off. . |
| 60137617 | 12/1983 | Japan . |
| 60228113 | 12/1983 | Japan . |
| 61-204234 | 3/1985 | Japan . |
| 60-137618 | 7/1985 | Japan . |
| 60-137619 | 7/1985 | Japan . |
| 60-138514 | 7/1985 | Japan . |
| 0358825 | 7/1989 | Japan . |
| 5239229 | 9/1993 | Japan . |
| 0679736 | 3/1994 | Japan . |
| 7024858 | 1/1995 | Japan . |

OTHER PUBLICATIONS

New Linear Polymers, McGraw–Hill Book Company, pp. 102–107, (1967).
Recent Tendency of LCD Display Polymer Material, Electrode Substrate Films, pp. 20–23, (1993).
Optical Designing of Simple Matrix ST LCD, Akio Murayama et al., (pp. 267–268), (1993).
STD–LCD phase Difference Film, Yasuo Fujimura et al. (pp. 37–41), (1991).

Primary Examiner—Philip Tucker
Attorney, Agent, or Firm—Sherman & Shalloway

[57] ABSTRACT

An optically isotropic film of an aromatic polyethersulfone, which is useful as a substrate for a liquid crystal display device, and an optically anisotropic, uniaxially oriented film of an aromatic polyethersulfone, which is useful as a phase difference plate for a liquid crystal display device. The optically isotropic film is produced by casting an aromatic polyethersulfone solution composition comprising 15 to 40 parts by weight of a solvent which contains at least 60% by weight of 1,3-dioxolane and can dissolve an aromatic polyethersulfone and 10 parts by weight of the aromatic polyethersulfone, on a substrate, and heating the cast solution composition containing a solvent to evaporate the solvent off.

7 Claims, 1 Drawing Sheet

FIG. 1

FILM OF AROMATIC POLYETHERSULFONE, PROCESS FOR THE PRODUCTION THEREOF, AND SOLUTION COMPOSITION FOR THE PRODUCTION THEREOF

This is a division of application Ser. No. 08/792,219 filed Jan. 31, 1997 now U.S. Pat. No. 5,759,449, which is a division of application Ser. No. 08/415,136, filed Mar. 30, 1995, now U.S. Pat. No. 5,645,766. Application Ser. No. 08/792,219 now U.S. Pat. No. 5,759,449 is incorporated herein in its entirety by reference thereto.

DETAILED DESCRIPTION OF THE INVENTION

The present invention relates to an aromatic polyethersulfone film useful in the optical field of a display device or in the field of electric and electronic equipment and machinery, and a process for the production thereof. More specifically, it relates to a solution casting method for the production of an aromatic polyethersulfone film having excellent surface properties, transparency and optical homogeneity and having a reduced residual solvent, from a solution composition (dope) containing 1,3-dioxolane which is a halogen-free solvent free from causing environmental pollution, and a film produced by said method.

In recent years, a liquid crystal display device attracts attention and is being put to practical use due to its small consumption of electric power and excellent image qualities. In the liquid crystal display device, a polymer film is used as a polarization plate, a protection layer, a phase difference plate (a retardation plate) and an electrode substrate. Of these, a polymer electrode substrate, i.e., a plastic substrate is used as a substitute for a conventional glass substrate, for decreasing the weight and thickness of the liquid crystal display device, and it is therefore required to have very high optical isotropy and uniformity for accurately transmitting polarized light being transmitted therethrough. The polymer electrode substance is further required to have heat resistance sufficient for withstanding heat applied when a film of a transparent electrode is formed or an orientation film is formed. For this reason, an unstretched polycarbonate film or polyarylate film is used, and a film of an aromatic polyethersulfone is also considered promising since it remarkably shows excellent properties in view of heat resistance [TAKA-HASHI Junji, "Recent Tendency toward Development of Electrode Substrate Film", Polymer Society, Excerpts of Study of Polymer Electronics, p. 20 (Nov. 11, 1993; in Sophia University)]. However, the defect of an aromatic polyethersulfone film is that, since it is highly polarizable due to an aromatic group contained in its molecule, it shows optical anisotropy even when its molecules are slightly oriented. Under the circumstances, it is a very important theme to develop a technique which enables the production of an aromatic polyethersulfone film having excellent optical isotropy with preventing the molecular orientation as much as possible.

On the other hand, a phase difference film is used for improving the visibility of an image in an STN liquid crystal display device or a TN liquid crystal display device, and it has a role of converting elliptically polarized light transmitted through a liquid crystal layer to linear polarized light. A uniaxially oriented polycarbonate film or polyvinyl alcohol film is mainly used as a material for a phase difference film of STN liquid crystal display device. To cope with demands for improving the image visibility of a fast-responding liquid crystal display, there is required a phase difference film having a wavelength dispersibility of a phase difference (retardation) agreeing with a high-speed liquid crystal layer, and an aromatic polyethersulfone film is considered highly promising [MURAYAMA Akio et al, "Optical Designing of Simple Matrix STN-LCD", Polymer Society, 2nd Polymer Material Forum. p. 267 (Dec. 1, 2, 1993 in National Education Hall, Tokyo)]. As described above, aromatic polyethersulfone is highly polarizable since its molecule contains an aromatic group, and is therefore easily imparted with a refractive index anisotropy by molecular orientation by subjecting the film to uniaxial stretching to cause molecular orientation. Therefore, the advantage of the aromatic polyethersulfone film is that the phase difference required of a phase difference film can be obtained by small stretching, while it is difficult to obtain an optically uniform oriented film. For obtaining such an optically uniform oriented film, it is required to use an unstretched film (base film) having highly optically isotropy, and it is therefore desired to develop a competent film-forming technique.

For improving the visibility of an STN liquid crystal display device, refractive index anisotropy in an in-plane area of a film is required as described above. However, for improving the visibility without dependency on a visual angle, it is required to increase the refractive index ($n_z$) in a perpendicular direction relative to the film surface [FUJIMURA Yasuo et al, "STN-LCD Phase Difference Film", "Denshi Zairyo (Electronic Material)", Feb. 1991, p. 37]. In films having an aromatic skeleton structure including a polycarbonate film, $n_z$ is very small due to so-called plane orientation, as compared with the minimum refractive index in the in-plane area, i.e., a refractive index ($n_f$) in a fast axis direction. In view of these points, it is desired to bring an $n_z/n_f$ value close to 1 when the film is formed. In other words, it is desired to produce a film having three-dimensional optical isotropy including the refractive index ($n_z$) in a perpendicular direction with regard to the film plane.

Generally, an aromatic polyethersulfone film is formed by a melt extrusion method, particularly a T-die method (with flat film die). The T-die method is widely used as a method for producing plastic films. However, since a melt having a high viscosity is extruded in this method, a polymer chain is liable to be oriented and a stress strain is liable to remain in the film, so that it is difficult to obtain optical isotropy or uniformity. For decreasing the melt viscosity, it is required to decrease the molecular weight of a plastic or increase the temperature for forming the film. However, when the molecular weight is decreased, the film shows decreased mechanical properties, and when the film-forming temperature is increased, the film is liable to undergo thermal deterioration or coloring. Further, since an extrudate from a T-die is directly and rapidly cooled, the film is liable to have streaks caused by the T-die, so-called T-die lines, and it is therefore difficult to produce a film having high surface properties [TAKAHASHI Junji, "Recent Tendency toward Development of Electrode Substrate Film", Polymer Society of Japan, Excerpts of Study of Polymer Electronics, p. 20 (Nov. 11, 1993; in Sophia University)]. The surface properties and optical uniformity required of a film used in a liquid crystal display device are considerably severe. For example, a film for a plastic substrate is required to have a surface thickness nonuniformity of up to ±5 µm, a phase difference (retardation) of 10 nm or less and an optical orientation angle of up to ±10°. A base film for a phase difference film is required to have a surface thickness nonuniformity of 2 µm or less and a phase difference of 30 nm or less. In present practice, it is difficult to accomplish these severe requirements by a melt extrusion method.

For avoiding the above problems, it is expected that the film is formed by a solution casting method. For producing a thick film having a thickness of about 100 μm such as a film for a liquid crystal display device, by a solution casting method, a solution (dope) having a high concentration is required. However, there is limitation on the selection of the solvent which can dissolve an aromatic polyethersulfone in a high concentration, can be relatively easily dried and can be used for forming a film (Henry Lee, Donald Stoffey and Kris Neville, New Linear Polymers, McGraw-Hill, p. 107). For example, the solvent is selected from polar aprotic solvents (e.g., dimethylacetamide, dimethylformamide and N-methylpyrrolidone), acetophenone, chlorobenzene and cyclohexanone. Since, however, these solvents have a high boiling point, the amount of a residual solvent in the formed film cannot be easily decreased, and these solvents are not suitable as the film-formation solvent for practical use. Cyclic ethers such as 1,4-dioxane and tetrahydrofuran can dissolve some kind of aromatic polyethersulfone. However, 1,4-dioxane is not that which has a low boiling point, and further, it is difficult to use 1,4-dioxane from a practical point of view since it is carcinogenic. Tetrahydrofuran is free of the problems of a boiling point and carcinogenic nature. However, it does not give a high solution viscosity and hence, it is difficult to form a uniform film. Halogen-containing solvents such as dichloromethane and chloroform may be selected as a good solvent, while these solvents involve the problem of environmental pollution, and are under suspicion as one of carcinogens. These solvents therefore tend to be prohibited from use. Further, since these solvents work as a corrosive compound during a long-term use even if the amount of them remaining in the film is very small, and the use thereof is therefore limited when they are used for a display device and an electric or electronic apparatus in which fine elements are used. In view of these points, it is expected to develop a technique for the production of a film from a halogen-free solvent.

Processes for the production of polysulfone films by a casting method are disclosed, for example, in the following Japanese Laid-open Patent Publications.

JP-A-60-137617 discloses a process for the production of an aromatic polyethersulfone film, which comprises dissolving an aromatic polyethersulfone in a mixed solvent containing a mixture of at least two kinds of halogen-containing solvents and an aliphatic alcohol and/or an aliphatic ester, casting the resultant solution on a substrate, and then removing the solvents.

JP-A-60-137618 discloses a process for the production of a polyethersulfone film, which comprises casting a polyethersulfone solution on a substrate, drying the solution until it forms a self-supporting film, peeling off the film from the substrate, and finally drying and heat-treating the film in the temperature range of ±30° C. of the glass transition temperature of the polyethersulfone without applying a tension of 500 g/cm$^2$ or higher. It is disclosed that the solvent for the polyethersulfone is selected from amide-containing solvents such as N,N-dimethylformamide and halogen-containing solvents such as dichloromethane and chloroform.

JP-A-60-137619 discloses a process for the production of an aromatic polyethersulfone film, which comprises casting an aromatic polyethersulfone solution having a rotational viscosity of $10^2$ to $2\times10^5$ centipoises at 25° C. on a substrate with a blade applicator and removing a solvent. It is disclosed that the solvent for the polyethersulfone is selected from amide-containing solvents such as N,N-dimethylformamide, cyclic, nitrogen-containing compounds such as N-methyl-2-pyrrolidone, chlorine-containing compounds such as dichloromethane and phenols such as p-chlorophenol.

JP-A-60-138514 discloses a process for the production of a liquid crystal cover film having a retardation value of 20 nm or less and a centerline average roughness, on the surface, of 0.2 μm or less, which comprises casting an aromatic polyethersulfone solution having a rotational viscosity of $10^2$ to $2\times10^6$ centipoises at 25° C. on a substrate, drying the solution until it forms a self-supporting film, peeling off the film from the substrate and finally drying and heat-treating the film at a temperature equivalent to, or higher than, the boiling point of a solvent until the amount of residual solvent is reduced to 5% by weight. It is disclosed that the solvent is selected from those disclosed in the above JP-A-60-137617.

JP-A-60-228113 discloses a process for the production of an aromatic polyethersulfone film, which comprises casting an aromatic polyethersulfone solution having a rotational viscosity of $5\times10^3$ to $10^6$ centipoises at 25° C. on a substrate through a slit having an opening of 0.1 to 2 mm at an average casting rate of 0.1 to 10 m/minute and removing a solvent. It is disclosed that the solvent is selected from those disclosed in the above JP-A-60-137619.

JP-A-61-204234 discloses a process for the production of an optically isotropic polysulfone film, which comprises casting a solution of a polysulfone in methylene chloride, drying the solution until the residual volatile content is 20% by weight or less, and peeling off a formed film from the substrate.

JP-A-3-58825 discloses a process for the production of a stretched film, which comprises drying and stretching an unstretched film or sheet formed from a polyethersulfone solution by a casting method, in a state where the amount of a residual solvent is in the range of 2 to 20% by weight. It is disclosed that the solvent is selected from dimethylformamide, dimethylacetamide and 1,1,2-trichloroethylene.

JP-A-6-79736 discloses a process for the production of a polysulfone-based resin film, which comprises casting a polysulfone-based resin solution having a water content of 0.2% by weight or less and drying the solution. It is disclosed that the solvent for dissolving the polysulfone-based resin film is selected from methylene chloride, 1,2-dichloroethane and chlorobenzene.

JP-A-5-239229 discloses a process for the production of a polysulfone film or sheet, which comprises peeling off a polysulfone film or sheet formed on a metal substrate by a solution casting method, from the metal substrate when the amount of a residual solvent has reached 20% by weight or less. It is disclosed that the solvent is selected from halogenated hydrocarbons such as methylene chloride; hydrocarbons such as hexane and benzene; esters such as ethyl acetate; ketones such as methyl ethyl ketone; alcohols such as cresol and isopropanol; sulfoxides such as DMSO; N-methylpyrrolidone and water.

JP-A-7-24858 discloses a process for the production of a film of a polysulfone resin, which comprises forming a film from a solution of a polysulfone resin in acetophenone or N-methylpyrrolidone by a solution casting method.

It is an object of the present invention to provide an optically isotropic film of an aromatic polyethersulfone which is excellent in surface properties, transparency and optical uniformity and which has a reduced residual solvent.

It is another object of the present invention to provide an optically anisotropic, uniaxially oriented film of an aromatic polyethersulfone.

It is further another object of the present invention to provide a substrate and a phase difference plate (a retardation plate) for a liquid crystal display, as products from the above film of the present invention.

It is yet another object of the present invention to provide a process for the production of an optically isotropic film of the present invention by a solution casting film-forming method without using any halogen-containing solvent which may cause environmental pollution or corrosion.

It is still further another object of the present invention to provide a solution composition of an aromatic polyethersulfone useful as a dope for the production of a film.

Other objects and advantages of the present invention will be apparent from the following description.

According to the present invention, the above objects and advantages of the present invention are achieved, first, by an optically isotropic film of an aromatic polyethersulfone, which (A) comprises an aromatic polyethersulfone, (B) has a transmittance to visible light at a wavelength of 550 nm in the range of from 86 to 91%, (C) has a haze value in the range of from 0.1 to 1%, (D) shows a refractive index difference ($\Delta n$) of 0.0010 or less, which is a difference between a refractive index ($n_s$) in the slow axis direction in an in-plane area of the film and a refractive index ($n_f$) in the fast axis direction in the in-plane area, (E) has a refractive index ratio ($n_z/n_f$) of 0.9997 to 1.0000, which is a ratio ($n_z/n_f$) of a refractive index ($n_z$) in the perpendicular direction with regard to a film surface to the refractive index ($n_f$), (F) has a thickness in the range of from 30 to 300 $\mu$m, and (G) has a thickness nonuniformity in the range of from 0.1 to 1% based on an average film thickness.

The above optically isotropic film of the present invention can be provided for the first time on the basis of the fact which the present inventors have found for the first time, i.e., the fact that (1) 1,3-dioxolane can dissolve an aromatic polyethersulfone in a high concentration and that (2) the resultant solution having a specific viscosity can give an optically isotropic flat film which is transparent without becoming opaque.

That is, according to the present invention, the above optically isotropic film of the present invention can be produced by a process of the present invention, which comprises

(1) casting an aromatic polyethersulfone solution composition containing 15 to 40 parts by weight of a solvent which contains at least 60% by weight of 1,3-dioxolane and can dissolve an aromatic polyethersulfone, and 10 parts by weight of an aromatic polyethersulfone, on a substrate, and (2) heating a cast film containing the solvent, to evaporate off the solvent.

The aromatic polyethersulfone used in the above step (1) of the process of the present invention generally refers to aromatic polyethersulfones in which aromatic groups are bonded to a skeleton through a sulfone group and an ether group. Such aromatic polyethersulfone is, for example, an aromatic polyethersulfone having at least one kind of recurring unit(s) selected from the group consisting of the following general formulae (1) to (3), (1)

(2)

(3)

wherein, in the formula (1), each of $Ar^1$ and $Ar^2$ is independently an aromatic hydrocarbon group having 6 to 12 carbon atoms, in the formula (2), each of $Ar^3$ to $Ar^6$ is independently an aromatic hydrocarbon group having 6 to 12 carbon atoms and X is a divalent hydrocarbon group having 1 to 15 carbon atoms, and in the formula (3), each of $Ar^7$ to $Ar^9$ is independently an aromatic hydrocarbon group having 6 to 12 carbon atoms.

In the above formula (1), each of $Ar^1$ and $Ar^2$ is preferably an arylene group having 6 to 12 carbon atoms, more preferably an arylene group having 6 to 10 carbon atoms. Specific examples thereof include m-phenylene, p-phenylene, dimethyl-p-phenylene, tetramethyl-p-phenylene, naphthylene and biphenylene groups. A polyethersulfone of the formula (1) in which both $Ar^1$ and $Ar^2$ are p-phenylene groups is advantageous in view of production, and particularly preferably used.

In the formula (2), each of $Ar^3$ to $Ar^6$ is preferably an arylene group having 6 to 12 carbon atoms, more preferably an arylene group having 6 to 10 carbon atoms. Specific examples thereof include m-phenylene, p-phenylene, dimethyl-p-phenylene, tetramethyl-p-phenylene, naphthylene and biphenylene groups. Each of $Ar^3$ to $Ar^6$ is particularly preferably a p-phenylene group. X is a divalent hydrocarbon group having 1 to 15 carbon atoms, and is selected from an aliphatic hydrocarbon group having 1 to 15 carbon atoms, an alicyclic hydrocarbon group and an aralkylene group. X is preferably a divalent aliphatic hydrocarbon group having 1 to 10 carbon atoms, more preferably 3 to 9 carbon atoms, an alicyclic hydrocarbon group or an aralkylene group. Specific examples of X include aliphatic hydrocarbon groups such as methylene, 1,1-ethylene, 2,2-propylene, 2,2-butylene and 4-methyl-2,2-pentylene groups, alicyclic hydrocarbon groups such as 1,1-cyclohexylene and 3,3,5-trimethyl-1,1-cyclohexylene groups, and aralkylene groups such as 1-phenyl-1,1-ethylene and diphenyl methylene groups. Of these, a 2,2-propylene group is more preferred. In the formula (2), particularly preferably, each of $Ar^3$ to $Ar^6$ is a p-phenylene group and X is a 2,2-propylene group.

In the formula (3), each of $Ar^7$ and $Ar^8$ is preferably an arylene group having 6 to 12 carbon atoms, more preferably an arylene group having 6 to 10 carbon atoms. Specific examples thereof include an m-phenylene, p-phenylene, dimethyl-p-phenylene, tetramethyl-p-phenylene, naphthylene and 4,4'-biphenylene groups. Of these, each of $Ar^7$ and $Ar^8$ is further preferably a p-phenylene group. $Ar^9$ is preferably an arylene group having 6 to 12 carbon atoms, more preferably an arylene group having 6 to 10 carbon atoms. Specific examples thereof include m-phenylene, p-phenylene, naphthylene and 4,4'-biphenylene groups. Of these, p-phenylene and 4,4'-biphenylene groups are further preferred. In the formula (3), particularly preferably, each of $Ar^7$, $Ar^8$ and $Ar^9$ is a p-phenylene group.

The aromatic polyethersulfone used in the present invention also includes a composition or a copolymer comprising at least one kind of recurring unit(s) of the above formulae (1) to (3). For example, when the aromatic polyethersulfone is a copolymer, preferred is an aromatic polyethersulfone having recurring units of the formulae (1) and (2) or an aromatic polyethersulfone having recurring units of the formulae (1) and (3). In this case, the proportions of recurring unit of the formula (1) and recurring unit of the formula (2), or the proportions of recurring unit of the formula (1) and recurring unit of the formula (3), i.e., the copolymerization composition ratio (1)/(2) or (1)/(3), can be determined in view of the solubility and heat resistance of an aromatic polyethersulfone to be obtained and the physical properties of a formed film. Although the above copolymerization composition ratio is not specially limited, preferred is an aromatic polyethersulfone containing 0.1 to 99.9 mol %, preferably 1 to 99 mol %, of recurring unit of the formula (1).

Of the above-described aromatic polyethersulfones, aromatic polyethersulfones of the following types are particularly preferred in view of availability, heat resistance and solubility. That is, particularly preferred are (i) a copolymer containing 70 to 90 mol % of recurring unit of the formula (1) in which each of $Ar^1$ and $Ar^2$ is a p-phenylene group and 30 to 10 mol % of recurring unit of the formula (3) in which each of $Ar^7$ to $Ar^9$ is a p-phenylene group, (ii) a polymer having recurring unit of the formula (2) in which each of $Ar^3$ to $Ar^6$ is a p-phenylene group and X is an isopropylidene group [$(CH_3)_2C<$], and (iii) a copolymer containing at least 70 mol % of recurring unit of the formula (2) in which each of $Ar^3$ to $Ar^6$ is a p-phenylene group and X is an isopropylidene group and 30 mol % or less of recurring unit of the formula (1) in which each of $Ar^1$ and $Ar^2$ is a p-phenylene group.

The above aromatic polyethersulfone can be produced by a known polymerization method. For example, it can be obtained by polycondensing a monomer having terminals of hydroxyl and halogen groups in a polar aprotic solvent in the presence of an alkali metal carbonate.

The molecular weight of the aromatic polyethersulfone used in the present invention is, when expressed by $\eta sp/c$, 0.1 to 10 dl/g, preferably 0.3 to 5.0 dl/g. The viscosity values are those measured in a 0.5 g/dl 1,3-dioxolane solution at 30° C. When this viscosity is smaller than 0.1 dl/g, no durable film can be obtained. When it exceeds 10 dl/g, undesirably, not only it is difficult to obtain the above polymer, but also the solubility of the aromatic polyethersulfone decreases.

The solvent used in the step (1) of the process of the present invention contains 1,3-dioxolane as a main component. This solvent has high solubility and a relatively low boiling point, and it can be suitably used as a solvent which gives a solution having a high concentration. Further, since it is a halogen-free solvent, it is almost free from causing environmental pollution and cancers which a halogen-containing solvent may cause, and moreover, is free of the following problems. That is, a halogen-containing solvent may generate a corrosive gas typified by hydrogen chloride by reacting, for example, with water in air, and may corrode a casting apparatus, particularly specular-finished metal cast drum and cast belt surfaces which can be said to be the heart of the apparatus. Further, when a film is formed from a solution composition containing a halogen-containing solvent, a trace amount of halogen ion remaining in the film may deteriorate the transparent electrode and TFT (thin film transistor) of a liquid crystal display device. 1,3-Dioxolane used in the present invention is a halogen-free solvent, and therefore is free of these possibilities.

The solvent used in the present invention is a solvent containing at least 60% by weight, preferably at least 70% by weight, of 1,3-dioxolane, and a solvent containing 1,3-dioxolane alone, i.e., a solvent containing 100% by weight of 1,3-dioxolane, is preferred. Other solvent which may be contained in the solvent used in the present invention is not specially limited, and it may be selected in the light of effects. The "effects" refer to effects on the improvement in the surface properties (leveling effect) of a film formed by a solution casting method, and effects on the evaporation rate, viscosity adjustment of the system and inhibition of the crystallization, when the solvents are mixed in such a range that the solubility and the stability are not impaired. The kind and amount of a solvent to be mixed can be determined depending upon the degrees of these effects. Further, at least two solvents may be mixed with 1,3-dioxolane. The solvent to be mixed with 1,3-dioxolane preferably includes cyclic ethers such as 1,4-dioxane and tetrahydrofuran, hydrocarbon solvents such as toluene and xylene, ketone solvents such as acetone, methyl ethyl ketone and cyclohexanone, ester solvents such as ethyl acetate and butyl acetate, and ether solvents such as ethylene glycol dimethyl ether and methoxyethyl acetate.

In the dope containing the aromatic polyethersulfone used in the present invention, the amount of the solvent per 10 parts by weight of the aromatic polyethersulfone is 15 to 40 parts by weight, preferably 20 to 35 parts by weight. When the amount of the solvent exceeds the above upper limit, the effective concentration of the aromatic polyethersulfone is undesirably low although the solution is stable. Moreover, when a film is formed from this solution composition by a solution casting method, undesirably, a rippling based on an external disturbance is liable to occur since the solution has a low viscosity, and it is difficult to obtain a film having surface flatness. When the amount of the solvent is less than the above lower limit, it is difficult to obtain a stable dope. The above concentration is determined mainly in view of the dope stability and the solution viscosity.

For easily peeling the film off from the substrate at the step (2) to be described later and for promoting the precipitation of a crystallizable cyclic oligomer contained in the polymer in the step (2), it is preferred to use water and/or an alcohol. The aromatic polyethersulfone used in the present invention has high adhesion to a metal plate generally used as a substrate. As a result, when the cast film is dried on the substrate and peeled off from the substrate to transfer it to a heat treatment step, it is difficult to peel off the film from the substrate. This problem naturally does not occur if the substrate is frequently cleaned, while this frequent cleaning step is an additional troublesome step and hence, is undesirable. The addition of a small amount of water and/or an alcohol has one significance that it can reduce the substrate-cleaning frequency. Another significance is that a crystal is precipitated. The aromatic polyethersulfone used in the present invention contains a small amount of a crystallizable cyclic oligomer such as the following compound.

The above compound gradually precipitates from the dope after the polymer is dissolved. Naturally, there is basically no problem generally industrially, since the dope is filtered halfway in the feeding of the dope from a dope storage tank to a film-forming head before use. However, a crystal precipitates in a site where a filtered dope is liable to reside so that the transparency of a film is often impaired. It is therefore important to precipitate most of crystals as soon as possible after the solution is prepared, and to manage to decrease the precipitation rate after the dope is filtered. For this purpose, it is preferred to use a linear or branched aliphatic alcohol having 1 to 6 carbon atoms, preferably 1 to 4 carbon atoms, such as methanol, ethanol, isopropanol or tertiary butanol. Higher alcohols having more carbon atoms than the above alcohols are not preferred since they have a high boiling point and are liable to remain after the film is formed. Further, it is not required to use a large amount of water and the alcohol. Generally, water and the alcohol are further added in an amount of 1 to 10% by weight, preferably 2 to 8% by weight, based on the total amount of the solvent. When the amount of water and the alcohol exceeds the above upper limit, undesirably, a polymer precipitates. When it is less than the above lower limit, there is no remarkable effect on the peeling of a film and the precipitation of a crystal.

When the prepared dope contains insolubles or floating substances such as impurities, or when the dope has a haze, it is desirable to remove them by treatment such as filtration. When this treatment is not carried out, the formed film may have degraded optical properties. Further, the prepared dope per se may be degraded in storage stability.

In the process of the present invention, the aromatic polyethersulfone is dissolved in the solvent containing 1,3-dioxolane as a main component to prepare a solution composition (dope), and the dope is cast on a substrate and heated to evaporate off the solvent, whereby a film is obtained. The industrial continuous film-forming process generally comprises three steps such as a casting step, a pre-drying step and a post-drying step. The casting step is a step in which the dope is cast flat and smooth, the pre-drying step is a step in which most of the solvent is removed from the cast dope by evaporation, and the post-drying step is a step in which the remaining solvent is removed.

In the casting step (1), there is used a method using a doctor blade, a method using a reverse roll coater, or a method of extruding the dope through a die. It is industrially the most general practice to continuously extrude the dope through a die onto a belt-shaped or drum-shaped substrate. Although not specially limited, the substrate is selected from a glass substrate, a stainless steel or ferrotype metal substrate and a plastic film of polyethylene terephthalate. For industrially obtaining a highly optically isotropic and excellently homogeneous film which the present invention seeks to produce, a specularly finished metal substrate is the most generally used.

The viscosity of a solution is generally an essential factor for forming a transparent and flat film from a dope. The solution viscosity differs depending upon the concentration and molecular weight of the resin and the kind of the solution, while the viscosity of the solution composition used in the present invention is preferably 500 to 50,000 cps, more preferably 700 to 30,000 cps. When this viscosity exceeds the above upper limit, undesirably, the solution shows decreased flowability so that no flat film is obtained in some cases. When it is less than the above lower limit, the flowability is so high that it is difficult to uniformly extrude the solution through a T-die generally used for casting, or that a surface nonuniformity occurs due to a rippling based on an external disturbance. As a result, no uniform and flat film can be obtained.

Before proceeding with the drying step after the casting step, the drying is suspended for a certain period of time to secure the flowability of the dope, whereby the film surface can be highly flattened (leveling effect). In this case, a volatile solvent having a low boiling point, such as dichloromethane or chloroform, remarkably evaporates even at room temperature. As a result, a rippling is induced by the evaporation, and at the same time, the surface is dried to cause an orange peel surface phenomenon. Since, however, 1,3-dioxolane used in the present invention has a proper boiling point and proper volatility, such a phenomenon scarcely occurs, and it is preferred for producing a film which is required to have high flatness.

In the pre-drying step, it is required to remove most of the solvent from the dope cast on the substrate by evaporation as promptly as possible. However, if the evaporation sharply occurs, the film suffers deformation due to foaming, and it is necessary to set drying conditions carefully. In the present invention, it is preferred and advantageous to initiate the drying at a temperature in the range whose upper limit is equal to, or preferably 10° C. lower than, the boiling point of the solvent which has the lowest boiling point among solvents used, and thereafter to increase the drying efficiency by increasing the temperature thereafter. The upper limit of the temperature at a final stage in this step is 120° C., preferably 100° C. In this step, when a residual solvent is contained in a large amount, the amount is as much as 25% by weight. Therefore, undesirably, a foaming takes place when the temperature is set at a temperature higher than the above upper limit. Further, air may be fed as required. In this case, the feed rate of air is generally up to 20 m/second, preferably up to 15 m/second. When the feed rate of air exceeds the above upper limit, undesirably, flat surface can not be obtained due to rippling caused by the air. The feed rate of air may be increased stepwise or continuously, and it is rather preferred to do so. At an initial state, no air may be fed for avoiding the rippling caused by the air. The film is present on the substrate at this stage, and is peeled off from the substrate at the end of this step. At this occasion, when the residual solvent amount is too large, the film is soft so that it is deformed. When the residual solvent amount is too small, the adhesion of the film to the substrate is high so that the film has a stress strain upon peeling-off. Therefore, the residual solvent amount is preferably 5 to 25% by weight, more preferably 7 to 20% by weight.

In the post-drying step, the film which has been peeled off from the substrate is required to be further dried until the residual solvent amount is 3% by weight or less, preferably 1% by weight or less, more preferably 0.5% by weight or less. When the residual solvent amount is large, the film undergoes deformation with time, or it undergoes a dimensional change, so-called thermal shrinkage, when heated in a post-treatment step. For a liquid crystal display device in particular, an optically uniform film is required and hence, it is required to control the heat treatment temperature strictly. Generally, the heat treatment temperature is in the range of from (Tg–120° C.) to Tg, preferably from (Tg–100° C.) to (Tg–10° C.) in terms of the glass transition temperature of the aromatic polyethersulfone used being Tg (°C.). When the heat treatment temperature is higher than the above upper limit, undesirably, the film undergoes heat deformation. When it is lower than the above lower limit, undesirably, the drying is too slow. Generally, occurrence of the heat deformation becomes less with a decrease in the residual solvent amount. It is therefore preferred to carry out the heat treatment at a low temperature at an initial stage and then increase the temperature stepwise or continuously.

The method of strictly controlling the post-drying step will be detailed hereinafter with reference to a generally employed method of forming a film in the present invention. Generally, it is industrial practice to employ a method in which a film is dried while the film is carried by a pin tenter method or a roll suspension method. In this case, a film excellent in optical isotropy can be obtained by drying the film in a state where the film can be shrank in the width direction. The drying is preferably carried out at a drying temperature T(°C.) in the range which satisfies the following inequality (I). As will be demonstrated in Referential Example 1 (FIG. 1), the glass transition temperature of an aromatic polyethersulfone greatly depends upon the residual solvent amount, and remarkably decreases with an increase in the residual solvent amount. When the drying temperature exceeds the upper limit, the film is liable to be undesirably deformed. In view of these points, in this step, it is required to control the drying temperature strictly.

In the present invention, the drying is carried out at a drying temperature which satisfies the following inequality (I), $$Tg'-50<T<Tg' \qquad (I)$$

wherein T (°C.) is a temperature in a dry atmosphere, and Tg' (°C.) is a glass transition temperature of an aromatic polyethersulfone containing a residual solvent, and this temperature increases with a decrease in the residual solvent amount which decreases as the drying proceeds.

More preferably, the drying temperature satisfies Tg'–30<T<Tg'.

The above Tg' is obtained by measuring the sample sealed in a closed cell at a temperature elevation rate of 20° C./minute in accordance with DSC (differential scanning calorimetry) method. The Tg' is defined to be a temperature at which a second-order change in heat flow commences.

As described already, Tg' depends upon the residual solvent amount. In the post-drying step, as the film is carried on, the residual solvent amount decreases, and Tg' accordingly increases. For efficiently drying the film without causing a strain on the film, the temperature is increased as Tg' increases. When the drying temperature is lower than Tg'–50° C., undesirably, the drying is not efficiently carried out. When it exceeds Tg', undesirably, a strain occurs.

In the present invention, air may be fed in the post-drying step as well as in the pre-drying step.

In the above drying step, the drying means is selected from hot air drying, electric heating and infrared heating. Further, microwave heating is also used. The principle of the microwave heating is based on shaking dipoles contained in a substance with a microwave. The absorption efficiency of the microwave depends upon the magnitude of a dipole moment and the easiness with which molecules are put in motion in agreement with the frequency of the microwave. Water is a typical substance which satisfies both of them, and a microwave is put to practical use as a so-called electronic oven and also industrially used for drying a product containing water. However, the microwave is not necessarily effective for general organic substances. The present inventors focussed on the following. Since a 1,3-dioxolane molecule has two oxygen atoms as electronegative atoms and the molecule is structurally asymmetric, the dipoles which the two oxygen atoms are related to do not compensate. In other words, the inventors noticed that a large dipole moment can be expected. On the other hand, the present inventor also focussed on the fact that an aromatic polyethersulfone has, in its molecule, a sulfone group having a large dipole moment. A microwave is accordingly applied to the drying of a film formed from a dope of an aromatic polyethersulfone in 1,3-dioxolane. As a result, it has been found that, surprisingly, the film can be dried very efficiently and that a uniform film free of foaming and orange peel surface can be obtained. The drying means used in the drying step in the present invention includes a microwave heating based on this discovery.

It is ideally preferred that the frequency of a microwave heating apparatus used in the present invention is set at a frequency at which 1,3-dioxolane and aromatic polyethersulfone molecules are both easily put to motion. However, the frequency is generally restricted by Radio Wave Law and a microwave electronic tube, and a general heating apparatus uses a frequency of 2,450 MHz. However, 915 MHz can be used so long as it does not jam other communications. Under the circumstances, in the present invention, the frequency of 2,450 MHz and the frequency of 915 MHz are preferably used. In the present invention, the microwave heating may be used through the drying and heat treatment steps, or it may be used in part of the steps. Further, the film may be dried by a continuous method (conveyer oven method) or by a batch method. The microwave intensity is determined in consideration of the foaming, orange peel surface and undulation of the film.

In the present invention, the drying step, i.e., the removal of solvent from the dope cast on the substrate, is generally carried out in air atmosphere, while it is preferred to carry out the drying step in an inert gas atmosphere.

The inert gas for constituting the above inert gas atmosphere includes non-oxidizing incombustible gases such as nitrogen gas, argon gas, helium gas and carbon dioxide gas. Of these, nitrogen gas and carbon dioxide gas are preferably used in view of economic performance.

The concentration of oxygen in the above inert gas is preferably 10% by volume or less, more preferably 8% by volume or less, particularly preferably 5% by volume or less. When the oxygen concentration is higher than 10% by volume, undesirably, the possibility of an explosion increases. The oxygen concentration can be set such that the above conditions are satisfied, and has no lower limit. The lower limit of the oxygen concentration may be determined as required in view of economic performance.

In the above inert gas atmosphere, the concentration of vapor of the solvent containing 1,3-dioxolane as a main component, contained in the dope, is preferably at least 3% by volume, more preferably at least 5% by volume in view of the efficiency of recovering the solvent and since the film is dried at a high rate. The upper limit of the above concentration is not specially limited, while it is preferably 50% of a saturated vapor concentration at a drying temperature. When the above concentration exceeds the above upper limit, undesirably, the drying rate decreases.

The inert gas containing the solvent vapor having the above concentration is introduced into a cooled condenser to recover the solvent in an inert gas atmosphere, whereby oxidizable 1,3-dioxolane can be stably recovered while preventing the formation of peroxide.

When the present invention is practiced, an inert gas source, such as a nitrogen source, equipped with a flow adjusting device is connected to an air introducing portion of a dryer, and a cooling-condenser apparatus is connected to an air outlet, whereby the solvent can be recovered from a high concentration of atmosphere. An apparatus of this type is already technically disclosed (see JP-B-55-36389 and JP-B-59- 21656).

Further, since most of the solvent is removed in the pre-drying step, it is not always necessary to carry out the post-drying step in the inert gas atmosphere, and it may be carried out in air. Even when the post-drying step is carried out in the inert gas atmosphere, it is self-evident that the solvent concentration in the atmosphere is preferably low. This step can be carried out according to the post-drying step in an air-atmosphere mentioned before.

As described above, since the drying in the inert gas atmosphere is free from the problem of explosion limit, the drying can be carried out in an atmosphere containing a high concentration of the solvent, and the solvent can be recovered by a simple condensation method. On the other hand, in an air atmosphere, it is required to carry out the drying in an atmosphere having a low solvent concentration below the explosion limit, and an adsorption method or a gas absorption method is all that can be applied. Therefore, the drying in an air atmosphere is unavoidably disadvantageous in view of the recovery of the solvent and the formation of peroxide. The drying in an inert gas atmosphere is advantageous since the air oxidation of the solvent does not take place so that the formation of peroxide is prevented. Further, it has been generally believed that the drying proceeds more efficiently with a decrease in the solvent vapor concentration. However, surprisingly, the drying proceeds smoothly even in a high-concentration atmosphere in the present invention, and when the drying is evaluated as a whole including the post-drying step, it has been found that the drying can be effected at a rate which is not inferior to the drying rate in an atmosphere having a low solvent concentration in air.

Thus, according to the present invention, as described above, there is provided an optically isotropic film of an aromatic polyethersulfone, which (A) comprises an aromatic polyethersulfone, (B) has a transmittance to visible light at a wavelength of 550 nm in the range of from 86 to 91%, (C) has a haze value in the range of from 0.1 to 1%, (D) shows a refractive index difference (Δn) of 0.0010 or less, which is a difference between a refractive index ($n_s$) in the slow axis direction in an in-plane area of the film and a refractive index ($n_f$) in the fast axis direction in the in-plane area, (E) has a refractive index ratio ($n_z/n_f$) of 0.9997 to 1.0000, which is a ratio ($n_z/n_f$) of a refractive index ($n_z$) in a perpendicular direction with regard to a film surface to the refractive index $n_f$, (F) has a thickness in the range of from 30 to 300 μm, and (G) has a thickness nonuniformity in the range of from 0.1 to 1% based on an average film thickness.

The optically isotropic film used in the present invention is required to have high transparency in use and optically high uniformity. The transmittance of the optically isotropic film to visible light at wavelength of 550 nm is in the range of 86 to 91%, preferably 87 to 90%. When the above transmittance is less than the above lower limit, undesirably, the light loss is large. When it exceeds the above upper limit, it is required to decrease the film thickness for avoiding the decrease of the transmittance due to absorption, and undesirably, the mechanical strength adequate for practical use cannot be obtained. The haze value of the film is 0.1 to 1%, preferably 0.15 to 0.7%. When the haze value exceeds the above upper limit, undesirably, the contrast of an image decreases due to scattering. The haze caused by a scattering within the film can be controlled by decreasing the film thickness. However, when the film thickness is decreased, undesirably, the mechanical strength adequate for practical use cannot be obtained, as described above.

When used as a substrate material for a liquid crystal display device, the optically isotropic film of the present invention performs a role of accurately transmitting polarized light which has passed through a polarization plate or polarized light which has passed through a liquid crystal layer, and the film itself is therefore required to be optically uniform. The meaning of being optically uniform corresponds to a very small variability of the birefringence. That is, in the optically isotropic film of the present invention, the refractive index difference (Δn) between a refractive index ($n_s$) in the slow axis direction in an in-plane area of the film and a refractive index ($n_f$) in the fast axis direction in the in-plane area is 0.0010 or less, preferably 0.0008 or less. When Δn is greater than the above, polarized light has a distortion, and such film is not suitable as a substrate for a liquid crystal display device.

The ratio ($n_z/n_f$) of the refractive index ($n_z$) in the perpendicular direction with regard to the film surface to the refractive index ($n_f$) in the fast axis direction is 0.9997 to 1.0000, preferably 0.9998 to 1.0000. When $n_z/n_f$ is less than 0.9997, undesirably, the effect on the improvement of visual angle of visibility greatly decreases. The $n_z/n_f$ ratio of greater than 1.0000 is hard or impossible to accomplish.

The average thickness of the optically isotropic film of the present invention is in the range of from 30 to 300 μm, preferably 50 to 200 μm. For a liquid crystal display device, preferred is the film having an average thickness of 50 to 200 μm. When the average thickness is larger than the above upper limit, it is difficult to remove the residual solvent. When it is smaller than the above lower limit, it is difficult to prevent the thickness nonuniformity. Further, the thickness nonuniformity greatly influences the optical properties. The thickness nonuniformity in this case corresponds to a fine uneven surface attributed to the roughness on the surface. In the present specification, the term "thickness nonuniformity" is defined to be a difference between the highest peak and the deepest bottom in the thickness of a film when the film is traced 1 cm in any place on the film. The measurement method therefor is not specially limited, while a needle-contact method is generally employed. The thickness nonuniformity of the optically isotropic film of the present invention is 0.1 to 1%, frequently 0.2 to 0.8%, of the average film thickness.

According to the present invention, the above optically isotropic film may be uniaxially stretched.

The uniaxial stretching may be carried out by any one of a method of uniaxial stretching in a longitudinal direction, a method of uniaxial stretching with a tenter in a transverse direction and a roll stretching method. The stretching temperature depends upon the Tg of the film used, and it is generally between (Tg−50° C.) and (Tg+30° C.), preferably between (Tg−30° C.) and (Tg+20° C.). When the stretching temperature exceeds the above upper limit, undesirably, the polymer undergoes orientation relaxation and the stretching effect is greatly reduced. When it is lower than the above lower limit, undesirably, it is difficult to accomplish uniform orientation since the molecular movement of the polymer is frozen. The stretch ratio is properly selected depending upon the magnitude of retardation of the film. Generally, the stretching is carried out such that the length of the stretched film is 1.05 to 2.0 times, preferably 1.1 to 1.5 times, as large as the unstretched film. When the stretch ratio exceeds the above upper limit, undesirably, the phase difference (retardation) Re=Δn·d (Δn=birefringence, d=film thickness) is large to excess. When it is less than the above lower limit, undesirably, the phase difference is small to excess.

According to the present invention, there is further provided an optically anisotropic, uniaxially oriented film of an aromatic polyethersulfone, which (A) comprises an aromatic polyethersulfone, (B) has a transmittance to visible light at a wavelength of 550 nm in the range of from 86 to 91%, (C) has a haze value in the range of from 0.1 to 1%, (D) shows a refractive index difference (Δn) in the range of from 0.0013 to 0.0230, which is a difference between a refractive index ($n_s$) in the slow axis direction in an in-plane area of the film and a refractive index ($n_f$) in the fast axis direction in the in-plane area, (F) has a thickness in the range of from 30 to 300 μm, a (G) has a thickness nonuniformity in the range of from 0.1 to 1% based on an average film thickness.

The optically anisotropic uniaxially oriented film of the present invention is suitably used as a phase difference film for a liquid crystal display device. In this sense, the transmittance and the haze value of the optically anisotropic uniaxially oriented film are the same as those of the already described optically isotropic film of the present invention. That is, the transmittance is 86 to 91%, preferably 87 to 90%. The haze value is 0.1 to 1%, preferably 0.15 to 0.7%. On the other hand, the refractive index difference (Δn) between a refractive index ($n_s$) in the slow axis direction in an in-plane area of the film and a refractive index ($n_f$) in the fast axis direction in the in-plane area is 0.0013 to 0.0230, preferably 0.0015 to 0.0200. When the refractive index difference is greater than the above upper limit or smaller than the above lower limit, undesirably, no intended phase difference effect can be obtained.

The average thickness of the optically anisotropic uniaxially oriented film of the present invention is in the range of from 30 to 300 μm, preferably 50 to 200 μm. When the average thickness is larger than the above upper limit, it is difficult to prevent the thickness nonuniformity. The thickness nonuniformity of the uniaxially oriented film is 0.1 to 1%, frequently 0.2 to 0.8%, based on the average film thickness.

The optically anisotropic uniaxially oriented film of the present invention is suitably used as a phase difference film for a liquid crystal display device.

The above film is required to have a large birefringence, while the variability of the birefringence is required to be small. For this purpose, it is required that the optical uniformity of the film is extremely high at the stage of the unstretched film. In view of these points, the above optically isotropic film having Δn of 0.0010 or less, preferably 0.0008 or less, is advantageously used.

Further, the phase difference (Re) at a wavelength of 590 nm, used in the present invention, is in the range of from 400 to 700 nm, preferably 420 to 650 nm, and the phase difference variability (ΔRe) is 0.01 to 2%, preferably 0.02 to 1.5%, based on the phase difference. When the phase difference variability is outside the above range, undesirably, the phase difference effect of a liquid crystal display device cannot be obtained. Further, when the phase difference variability exceeds the above upper limit, undesirably, a uniform image, especially in terms of color and contrast, can not be obtained. When it is less than the above lower limit, undesirably, it is difficult to control the phase difference variability. Here, ΔRe is a variability of Re measured 5 times at various portions in an area of 10 cm×10 cm in square of the film.

According to the present invention, there can be obtained an aromatic polyethersulfone film which is excellent in surface properties, optical properties and uniformity and has a reduced residual solvent by a casting method, in the presence of 1,3-dioxolane as a main solvent, which is a halogen-free solvent free from causing environmental pollution and corrosion. The obtained film is useful as an optical film, particularly as a phase difference film, for a liquid crystal display device.

The present invention will be detailed hereinafter with reference to Examples. Measurements in Examples were carried out as follows.

Solution viscosity: Measured at 30° C. with a Brookfield viscometer BH model supplied by Tokyo Keiki K.K.

Glass transition temperature: TA Instruments DSC 2920 Differential Scanning Calorimeter.

Heat shrinkage percentage: A film having a length of 20 cm was heat-treated at a predetermined temperature for a predetermined period of time, and a dimensional change between the film before the heat treatment and the film after the heat treatment was determined.

Film thickness: Measured with a needle-contact type film-thickness measuring meter supplied by Anritsu K.K.

Transmittance: Measured with an ultraviolet visible light spectrometer (UV-240) supplied by Shimadzu Corporation.

Haze value: Measured with an automatic digital haze meter UDH-20D supplied by Nippon Denshoku Kogyo K.K.

Phase difference: Measured with an automatic birefringence meter KOBURA-21ADH supplied by KS Systems K.K.

Quantitative determination of residual solvent: A sample film was heated at 200° C. in a nitrogen atmosphere overnight. The sample film was measured for weights before the heating and after the heating.

Quantitative determination of peroxide: Determined by a titration method.

EXAMPLE 1

10 Parts by weight of an aromatic polyethersulfone [$\eta_{sp}/c$=0.33 dl/g (0.5 g/l in 1,3-dioxolane at 30° C.)] containing 78% of recurring unit of the formula (1) in which each of $Ar^1$ and $Ar^2$ was a p-phenylene group and 22% of recurring unit of the formula (3) in which each of $Ar^7$, $Ar^8$ and $Ar^9$ was a p-phenylene group was gradually added to, and dissolved in, 23.3 parts by weight of 1,3-dioxolane with stirring at 50° C., to give a transparent and viscous dope. The dope had a solution viscosity of 2.8×10$^3$ cps at 30° C. This solution showed no change when allowed to stand in a closed state at room temperature for 1 week.

The above dope was filtered through a filter having an opening diameter of 5 μm, and cast on a fully cleaned ferrotype substrate with a doctor blade. Then, the cast dope was heated at 65° C. for 15 minutes and at 90° C. for 10 minutes to dry it, and the resultant film was peeled off from the substrate. The peeled film was heat-treated at 120° C. for 20 minutes, at 150° C. for 30 minutes and at 200° C. for 120 minutes to give a transparent film having a thickness of 98 μm. The so-obtained film was free of foaming, an orange peel surface and a waving phenomenon, and was uniform. Further, the residual solvent amount was 0.3% by weight. The film had a thickness nonuniformity of 0.43 μm and was very uniform. The transmittance of the film to visible light at a wavelength of 550 nm was 88%, and the film had a haze value of 0.5% and had very high transparency. The average refractive index of the film, measured with sodium D ray, was 1.6500, and the difference between the refractive index ($n_s$) of the film in the slow axis direction and the refractive index ($n_f$) of the film in the fast axis direction was less than 0.0001. Thus, the film was highly optically isotropic. The film was measured for a phase difference at a wavelength of 590 nm to show less than 10 nm, and the variability in the film was small. Further, the variability in the slow axis was ±10° or smaller, and the film was optically uniform. The film was measured for a glass transition point by DSC to show 213° C. and thus had very high heat resistance. Further, the film showed an elastic modulus of 238 kg/mm$^2$, a break strength of 8.6 kg/mm$^2$ and an elongation at breakage of 15%, and thus had sufficient strength. The film was measured for heat shrinkage at 100° C./30 minutes and at 150° C./30 minutes to show 0.03% in both the cases, and thus had high dimensional stability.

The above-obtained film was uniaxially stretched 1.1 times at 195° C. The stretched film had a thickness of 95 μm and a thickness nonuniformity of 0.48 μm. Further, the film showed a phase difference (Re) 520 nm and a phase difference variability of 8 nm. The Δn value of the film was 0.0055 nm. The ratio of the phase difference (Re) at a wavelength of 450 nm to the phase difference at a wavelength of 550 nm was 1.14, and the dependency of the phase difference on wavelength was high as compared with polycarbonate (1.08), and the film was found to be effective as a phase difference film for fast-responding liquid crystal display.

COMPARATIVE EXAMPLE 1

An attempt was made to prepare a dope in the same manner as in Example 1 except that 1,3-dioxolane was replaced with 1,4-dioxane or tetrahydrofuran, but no homogeneous solution was obtained.

EXAMPLE 2

A dope was prepared in the same manner as in Example 1 except that 23.3 parts by weight of 1,3-dioxolane was replaced with 30 parts by weight of 1,3-dioxolane. The dope had a solution viscosity of 1.4×10$^3$ cps at 30° C.

A film having a thickness of 86 μm was obtained from the above dope by a doctor blade method in the same manner as in Example 1. The film was free of foaming, an orange peel surface and a waving phenomenon and was uniform. The residual solvent amount thereof was very small, as small as 0.3%. The transmittance of the film to visible light was 85%, and the film had a haze value of 0.6% and had very high transparency. The film was measured for a phase difference at a wavelength of 590 nm to show less than 10 nm, and the variability in the film was small. Further, the variability in the slow axis was ±10° or smaller, and the film was optically uniform. The film was measured for a glass transition point by DSC to show 210° C. and thus had very high heat resistance.

COMPARATIVE EXAMPLE 2

A dope was prepared in the same manner as in Example 1 except that 23.3 parts by weight of 1,3-dioxolane was replaced with 57 parts by weight of 1,3-dioxolane. The dope was stable. The dope had a solution viscosity of less than 100 cps and thus had a very low viscosity. A film was formed from the dope by a doctor blade method in the same manner as in Example 1 to give a very poor film having a thickness of about 22 μm. The film had an orange peel-like unevenness all over the surface and was not suitable for use.

COMPARATIVE EXAMPLE 3

An attempt was made to prepare a dope in the same manner as in Example 1 except that 23.3 parts by weight of 1,3-dioxolane was replaced with 13 parts by weight of 1,3-dioxolane. However, the dope contained a large residual insoluble content. When the dope containing the residual insoluble content was allowed to stand at room temperature for 24 hours, the dope formed a gel as a whole to lose its flowability. An attempt was made to form a film from the dope in the same manner as in Example 1 immediately after the dope was prepared, but no homogeneous film was obtained.

EXAMPLE 3

10 Parts by weight of an aromatic polyethersulfone [$\eta_{sp}/c$=0.5 dl/g (0.5 g/l in 1,3-dioxolane at 30° C.)] formed of recurring unit of the formula (2) in which each of Ar$^3$ to Ar$^6$ was a p-phenylene group and X was a 2,2-propylene group [—C(CH$_3$)$_2$—] was dissolved in 30 parts by weight of 1,3-dioxolane with stirring at 50° C., to give a transparent and viscous dope. The dope had a solution viscosity of 3.2×10$^3$ cps at 30° C. This solution was aged at room temperature for 4 days to precipitate a white crystal of a cyclic oligomer. This crystal was removed by filtration with a filter having an opening diameter of 5 μm, and the dope was cast on a fully cleaned ferrotype substrate with a doctor blade. Then, the cast dope was heated at 65° C. for 10 minutes and at 90° C. for 10 minutes to dry it, and the resultant film was peeled off from the substrate. The peeled film was heat-treated at 120° C. for 20 minutes, at 150° C. for 10 minutes and at 180° C. for 120 minutes to give a transparent film having a thickness of 103 μm. The so-obtained film was free of foaming, an orange peel surface and a waving phenomenon and was uniform. Further, the residual solvent amount was 0.3% by weight. The film had a thickness nonuniformity of 0.39 μm and was very uniform. The transmittance of the film to visible light at a wavelength of 550 nm was 89.1%, and the film had a haze value of 0.3% and had very high transparency. The average refractive index of the film, measured with sodium D ray, was 1.6334, and the difference between the refractive index ($n_s$) of the film in the slow axis direction and the refractive index ($n_f$) of the film in the fast axis direction was less than 0.0001. Thus, the film was highly optically isotropic. The ratio ($n_z/n_f$) of the refractive index ($n_z$) in the perpendicular direction with regard to the film surface to the refractive index ($n_f$) in the fast axis direction was 0.9999, and the film thus had high three-dimensional optical isotropy including the isotropy in the perpendicular direction. The film was measured for a phase difference at a wavelength of 590 nm to show less than 10 nm, and the variability in the film was small. Further, the variability in the slow axis was ±10 or smaller, and the film was optically uniform. The film was measured for a glass transition point by DSC to show 189° C. and thus had very high heat resistance. Further, the film showed an elastic modulus of 225 kg/mm$^2$, a break strength of 7.0 kg/mm$^2$ and a elongation at breakage of 37%, and thus had sufficient strength. The film was measured for heat shrinkage percentages at 100° C./30 minutes and at 150° C./30 minutes to show 0.02% in both the cases, and thus had high dimensional stability.

The above-obtained film was uniaxially stretched 1.1 times at 191° C. The stretched film had a thickness of 100 μm and a thickness nonuniformity of 0.45 μm. Further, the film showed a phase difference (Re) 580 nm and a phase difference variability of 8 nm. The Δn value of the film was 0.0058 nm. The ratio of the phase difference (Re) at a wavelength of 450 nm to the phase difference at a wavelength of 550 nm was 1.14, and the dependency of the phase difference on wavelength was high as compared with polycarbonate (1.08). The film was thus found to be effective as a phase difference film for fast-responding liquid crystal display.

EXAMPLE 4

10 Parts by weight of an aromatic polyethersulfone [$\eta_{sp}$/c=0.41 dl/g (0.5 g/l in 1,3-dioxolane at 30° C.)] formed of recurring unit of the formula (2) in which each of $Ar^3$ to $Ar^6$ was a p-phenylene group and X was a 2,2-propylene group [—$C(CH_3)_2$—] was dissolved in 27 parts by weight of 1,3-dioxolane with stirring at 50° C., to give a transparent and viscous dope. The dope had a solution viscosity of 2.3×10$^3$ cps at 30° C. This solution was aged at room temperature for 4 days to precipitate a white crystal of a cyclic oligomer. This crystal was removed by filtration with a filter having an opening diameter of 5 μm. A film having a thickness of 93 μm was formed from the dope by a doctor blade method in the same manner as in Example 3. The film was free of foaming, an orange peel surface and a waving phenomenon, and was uniform. The residual solvent amount thereof was very small, as small as 0.3%. The transmittance of the film to visible light was 89.3%, and the film had a haze value of 0.4% and was optically transparent. The film was measured for a phase difference at a wavelength of 590 nm to show less than 10 nm, and the variability in the film was small. Further, the variability in the slow axis was ±10 or smaller, and the film was optically uniform. The film was measured for a glass transition point by DSC to show 189° C. and thus had very high heat resistance. The film was measured for heat shrinkage at 100° C./30 minutes and at 150° C./30 minutes to show 0.02% in both the cases, and thus had high dimensional stability.

EXAMPLE 5

A dope was prepared in the same manner as in Example 4 except that 27 parts by weight of 1,3-dioxolane was replaced with 40 parts by weight of 1,3-dioxolane. The dope had a solution viscosity of 8.0×10$^2$ cps. This solution was filtered and formed into a film in the same manner as in Example 3 to give a film having a thickness of 53 μm. The film was free of foaming, an orange peel surface and a waving phenomenon. The film had a thickness nonuniformity of 0.38 μm, and was uniform. The transmittance of the film to visible light was 89.4%, and the film had a haze value of 0.2% and was thus optically transparent. The film was measured for a phase difference at a wavelength of 590 nm to show less than 10 nm, and the variability in the film was small.

COMPARATIVE EXAMPLE 4

A dope was prepared in the same manner as in Example 5 except that 40 parts of 1,3-dioxolane was replaced with 40 parts of tetrahydrofuran. The dope had a very low solution viscosity, as low as 3.2×10$^2$ cps. The dope was filtered, and then formed into a film. The film had an orange peel surface all over and was not suitable for use. Further, since the dope had a low viscosity, the film thickness even in its thicker portion was as small as 35 μm, and the film had a thickness nonuniformity of as much as 3.5 μm.

EXAMPLE 6

10 Parts by weight of an aromatic polyethersulfone [$\eta_{sp}$/c=0.30 dl/g (0.5 g/l in 1,3-dioxolane at 30° C.)] containing 78% by weight of recurring unit of the formula (1) in which each of $Ar^1$ and $Ar^2$ was a p-phenylene group and 22% by weight of recurring unit of the formula (3) in which each of $Ar^7$, $Ar^8$ and $Ar^9$ was a p-phenylene group was dissolved in 35 parts by weight of 1,3-dioxolane containing 10% by weight of 1,4-dioxane, tetrahydrofuran or cyclohexanone with stirring at 50° C., to give transparent and viscous dopes. Films having a thickness of about 60 μm were formed from the dopes in the same manner as in Example 1. These films were free of foaming, an orange peel surface and a waving phenomenon, and were optically uniform. The transmittance of each of the films obtained from the dope containing 1,4-dioxane, tetrahydrofuran or cyclohexanone in combination was 87.9, 88.0 or 88.0%, and each film had a haze value of 0.4% and was remarkably highly transparent.

EXAMPLES 7–10

The aromatic polyethersulfones used in Examples 1 and 3 were tested for their peelings from a substrate. A fully cleaned and dried, fresh ferrotype substrate was used as the substrate. The polymer used in Example 1 was dissolved in 1,3-dioxolane which further contained a predetermined solvent. The resultant dope was filtered in the same manner as in Example 1, and then cast on the substrate. The cast dope was dried at 65° C. for 15 minutes and at 90° C. for 10 minutes to form a film, and then the film was peeled off from the substrate. The above operation procedure was repeated using the same substrate to determine how many times the peeling was possible, and the upper limit of the number of times of the peeling that was possible was taken as a number of times of peeling. The polymer used in Example 3 was dried under heat at 65° C. for 10 minutes and at 90° C. for 10 minutes, and then peeled off from the same substrate as the above. Table 1 shows the results. As is clear in Table 1, when a proper amount of water, ethanol or isopropanol was added to 1,3-dioxolane, the films were excellent in the property of being peeled off from the substrate.

TABLE 1

| | Polymer | Solvent (%) | Number of times of peeling |
| --- | --- | --- | --- |
| Ex. 7 | PSF | water (3) | 5< |
| Ex. 8 | PSF | ethanol (3) | 5< |
| Ex. 9 | PSF | isopropanol (3) | 5< |
| Ex. 10 | PES | water (3) | 5< |

Ex. = Example
PES = Aromatic polyethersulfone used in Example 1
PSF = Aromatic polyethersulfone used in Example 3

EXAMPLE 11

A dope (A) in 1,3-dioxolane which was the same as that in Example 3 was prepared in the same manner as in Example 3, and a dope (B) in 1,3-dioxolane further containing 3% of water, which was the same as that in Example 10 was prepared in the same manner as in Example 10. Immediately after the dopes were prepared, the dopes were placed in 1 cm cells and measured for a haze value to show 0.1% each. When the dopes were allowed to stand at room temperature for 4 days, white precipitates were formed. The dopes were filtered through a filter having an opening diameter of 0.5 μm to show a haze value of 0.1% each. Further, when the filtrates were allowed to stand at room temperature for 2 days, the filtrate from the dope (A) had a haze value of 34%, while the filtrate from the dope (B) had a haze value of 0.1% and showed no change.

REFERENTIAL EXAMPLE 1

Figure 1:
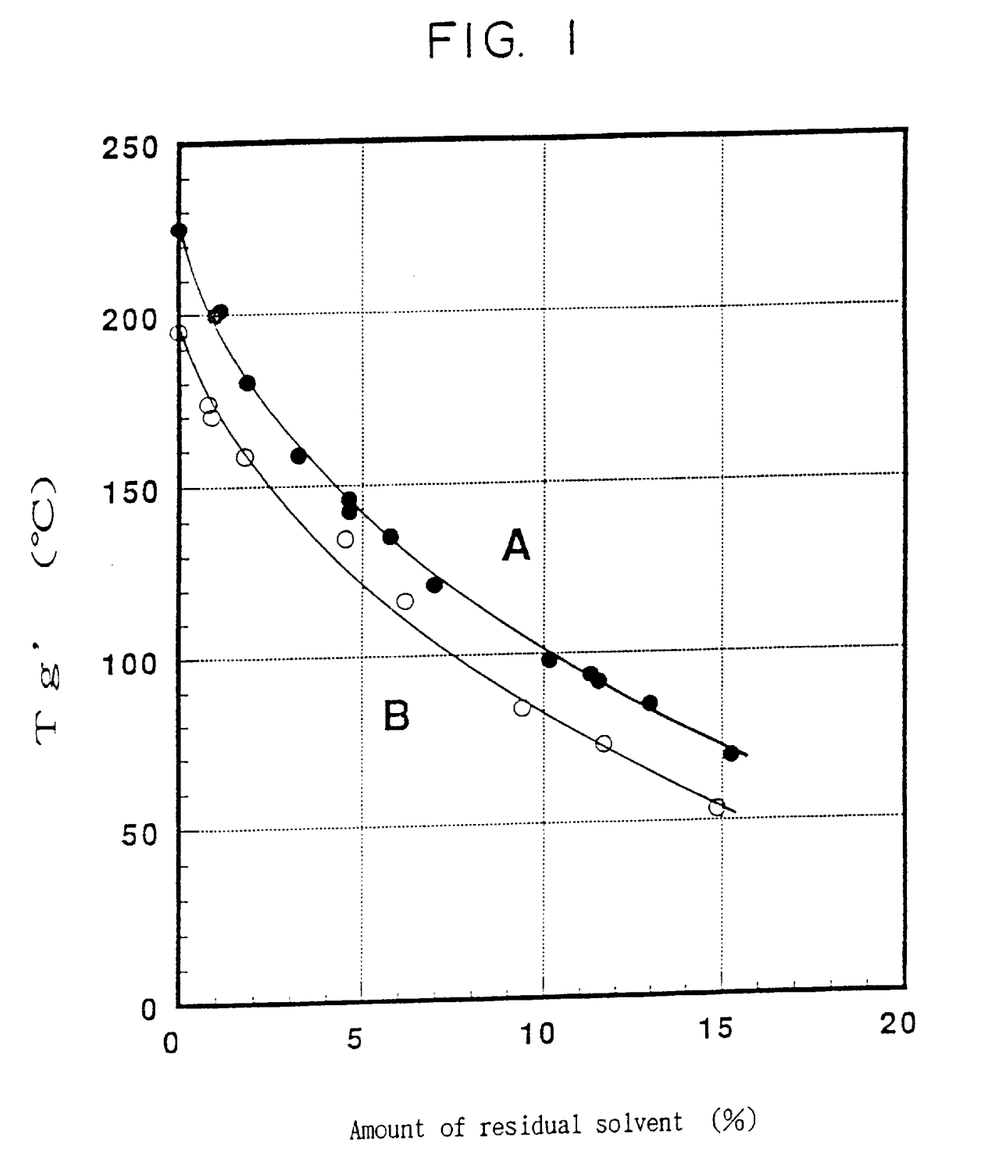
FIG. 1 shows the relationship of the glass transition temperature (Tg) of the aromatic polyethersulfone to the residual solvent content of the aromatic polysulfone.

Films having a thickness of about 100 μm and having different residual solvent amounts were formed from the same dopes as those in Examples 1 and 3 by changing the drying conditions. FIG. 1 shows the glass transition points (Tg') of these films. In FIG. 1, curves A and B correspond to curves from the dopes in Examples 1 and 3. As is clear in FIG. 1, Tg' remarkably decreased with an increase in the residual solvent amounts.

EXAMPLE 12

A film was continuously formed from the same dope as that in Example 3. A casting apparatus had a system in which a film was extruded through a die onto a belt and the belt was connected to a drying furnace which was separated to 4 zones. Further, a heat-treatment furnace (post-drying furnace) had a system in which the film peeled off from the belt was treated in a furnace which was separated to 6 zones. The dope was cast with this apparatus, and then the temperature in the pre-drying furnace was stepwise elevated to 40° C. (no air current), 65° C. (air current 1 m/second) and 90° C. (air current 5 m/second), followed by final cooling at 40° C. The film was prepared as a self-supporting film having a residual solvent amount of 10% by weight. At this stage, the film was peeled off from the belt, and transferred to the post-drying furnace. In the post-drying furnace, in a state where the film was shrinkable in the width direction, the temperature was stepwise elevated, according to residual solvent amounts, to 75° C. (residual solvent amount 10% by weight, Tg'=85° C.), 115° C. (residual solvent amount 5% by weight, Tg'=120° C.), 150° C. (residual solvent amount 2% by weight, Tg'=160° C.), 165° C. (residual solvent amount 1.5% by weight, Tg'=170° ° C.), 170° C. (residual solvent amount 1% by weight, Tg'=180° C.) and 180° C. (residual solvent amount 0.5% by weight, Tg'=185° C.) to obtain a dry film. The so-obtained film had a residual solvent amount of 0.3% by weight. The film had a thickness of 100 μm and a thickness nonuniformity of 0.25 μm and was remarkably uniform. The transmittance of the film to visible light at a wavelength of 550 nm was 89.2%, and the film had a haze value of 0.2% and was highly transparent. The average refractive index of the film, measured with sodium D ray, was 1.6334, and the difference between the refractive index ($n_s$) of the film in the slow axis direction and the refractive index ($n_f$) of the film in the fast axis direction was less than 0.0001. Thus, the film was highly optically isotropic. The film was measured for a phase difference at a wavelength of 590 nm to show less than 10 nm, and the variability in the film was small.

EXAMPLE 13

A film was continuously formed from the same dope as that in Example 1. The same casting apparatus as that used in Example 12 was used. The dope was cast with this apparatus, and then the temperature in the pre-drying furnace was stepwise elevated to 40° C. (no air current), 65° C. (air current 2 m/second) and 90° C. (air current 5 m/second), followed by final cooling at 40° C. The film was prepared as a self-supporting film having a residual solvent amount of 12% by weight. At this stage, the film was peeled off from the belt, and transferred to the post-drying furnace. In the post-drying furnace, the temperature was stepwise elevated, according to residual solvent amounts, to 85° C. (residual solvent amount 12% by weight, Tg'=90° C.), 110° C. (residual solvent amount 7% by weight, Tg'=120° C.), 155° C. (residual solvent amount 3% by weight, Tg'=160° C.), 175° C. (residual solvent amount 1.5% by weight, Tg'=180° C.), 190° C. (residual solvent amount 1% by weight, Tg'=200° C.) and 200° C. (residual solvent amount 0.5% by weight, Tg'=210° C.) to obtain a dry film. The so-obtained film had a residual solvent amount of 0.3% by weight. The film had a thickness of 103 μm and a thickness nonuniformity of 0.42 μm and was remarkably uniform. The transmittance of the film to visible light at a wavelength of 550 nm was 88.2%, and the film had a haze value of 0.3% and was highly transparent. The average refractive index of the film, measured with sodium D ray, was 1.6500, and the difference between the refractive index ($n_s$) of the film in the slow axis direction and the refractive index ($n_f$) of the film in the fast axis direction was less than 0.0001. Thus, the film was highly optically isotropic. The ratio ($n_z/n_f$) of the refractive index ($n_z$) in the perpendicular direction with regard to the film surface to the refractive index ($n_f$) in the fast axis direction was 0.9999, and the film thus had high three-dimensional optical isotropy including the isotropy in the perpendicular direction. The film was measured for a phase difference at a wavelength of 590 nm to show less than 10 nm, and the variability in the film was small.

EXAMPLE 14

The same solution of an aromatic polyethersulfone in 1,3-dioxolane as that prepared in Example 1 was cast on a fully cleaned ferrotype substrate by a doctor blade method. Then, the cast solution was heated in a nitrogen gas atmosphere containing 12% by volume of 1,3-dioxolane, at 65° C. for 15 minutes and then heated at 90° C. for 10 minutes. The formed film was peeled off from the substrate. Then, in air, the peeled film was heat-treated at 120° C. for 20 minutes, at 150° C. for 30 minutes and at 200° C. for 120 minutes to give a transparent film having a thickness of 99 μm. The so-obtained film was free of foaming, an orange peel surface and waving and was uniform. Further, the residual solvent amount was 0.2% by weight, which was almost equivalent to the film obtained in Example 1 under the same conditions in an air atmosphere having a low solvent concentration. The transmittance of the film to visible light at a wavelength of 550 nm was 88.1%, and the film had a haze value of 0.4% and had very high transparency.

Further, 1,3-dioxolane in a drying furnace having a nitrogen gas atmosphere was recovered through an exhaust outlet, trapped at −70° C. and measured for an amount of peroxide contained therein. The result was that the recovered 1,3-dioxolane had a peroxide amount of 109 ppm, while the 1,3-dioxolane used had a peroxide amount of 100 ppm. It was therefore shown that almost no peroxide was formed during the film formation.

EXAMPLE 15

The same dope as that prepared in Example 3 was cast on a glass substrate, and dried in a 2,450 MHz microwave heating apparatus at 100 W for 3 minutes, at 200 W for 7 minutes, at 300 W for 3 minutes and at 500 W for 10 minutes. The resultant film was peeled, and then heat-treated at 120° C. for 20 minutes, at 150° C. for 10 minutes and further at 180° C. for 60 minutes. The film had a residual solvent amount of 0.5%. The transmittance of the film to visible light at a wavelength of 550 nm was 89.2%, and the film had a haze value of 0.5% and was highly transparent. The film was measured for a phase difference at a wavelength of 590 nm to show less than 10 nm, and the variability in the film was small. Further, the variability in the slow axis was ±10 or smaller, and the film was optically uniform. The film was measured for a glass transition point by DSC to show 188° C. and thus had very high heat resistance. The film showed an elastic modulus of 218 kg/mm$^2$, a break strength of 7.1 kg/mm$^2$ and an elongation at breakage of 35%, and thus had sufficient strength. The film was measured for heat shrinkage percentages at 100° C./30 minutes and at 150° C./30 minutes to show 0.04% in both the cases, and thus had high dimensional stability.

EXAMPLE 16

A dope was prepared by dissolving 10 parts by weight of an aromatic polyethersulfone in 24.5 parts by weight of 1,3-dioxolane containing 3% by weight of methanol in the same manner as in Example 5. The dope had a solution viscosity of 3.3×10$^3$ cps. The dope was cast on a glass substrate, and dried under heat at 65° C. for 15 minutes and at 90° C. for 10 minutes, and the resultant film was peeled off from the substrate. The film was dried in a 2,450 MHz microwave heating apparatus at 500 W for 60 minutes. The film was free of foaming, an orange peel surface and waving, and was very uniform. The film had a residual solvent amount of 6%. The peeled film was further heat-treated at 180° C. for 120 minutes. The resultant film had a residual solvent amount of 0.4% and was thus highly transparent. The film was measured for a phase difference at a wavelength of 590 nm to show less than 10 nm, and the variability in the film was small. Further, the variability in the slow axis was ±10 or smaller, and the film was optically uniform. The film was measured for a glass transition point by DSC to show 192° C. and thus had very high heat resistance.

EXAMPLE 17

10 Parts by weight of an aromatic polyethersulfone [$\eta_{sp}$/c=0.42 dl/g (0.5 g/l in 1,3-dioxolane at 30° C.)] containing 24% of recurring unit of the formula (1) in which each of Ar$^1$ and Ar$^2$ was a p-phenylene group and 76% of recurring unit of the formula (2) in which each of Ar$^3$ to Ar$^6$ was a p-phenylene group and X was a 2,2-propylene group [—(CH$_3$)$_2$—] was dissolved in 30 parts by weight of 1,3-dioxolane with stirring at 50° C., to give a transparent and viscous dope. The dope had a solution viscosity of 1.3×10$^3$ cps at 30° C. The dope was filtered through a filter having an opening diameter of 5 μm, and cast by a doctor blade method in the same manner as in Example 1, and the cast dope was dried at 65° C. for 30 minutes and at 90° C. for 10 minutes, peeled off from the substrate and then dried at 120° C. for 15 minutes, at 150° C. for 30 minutes and at 200° C. for 60 minutes to give a transparent film having a thickness of 93 μm. The film was free of foaming, an orange peel surface and a waving phenomenon and was uniform. The residual solvent amount thereof was very small, as small as 0.4%. The film had a thickness nonuniformity of 0.38 μm and was very uniform. The transmittance of the film to visible light was 87.3%, and the film had a haze value of 0.6% and was optically transparent. The film was measured for a phase difference at a wavelength of 590 nm to show less than 10 nm, and the variability in the film was small. Further, the film was measured for a glass transition point by DSC to show 193° C. and thus had very high heat resistance. The film was measured for heat shrinkage percentages at 100° C./30 minutes and at 150° C./30 minutes to show 0.02% in both the cases, and thus had high dimensional stability.

What is claimed is:

1. An optically isotropic film of an aromatic polyethersulfone which is free of halogen containing solvent, which
   (A) comprises an aromatic polyethersulfone,
   (B) has a transmittance to visible light at a wavelength of 550 nm in the range of from 86 to 91%,
   (C) has a haze value in the range of from 0.1 to 1%,
   (D) shows a refractive index difference (Δn) of 0.0010 or less, which is a difference between a refractive index ($n_s$) in the slow axis direction in an in-plane area of the film and a refractive index ($n_f$) in the fast axis direction in the in-plane area,
   (E) has a refractive index ratio ($n_z/n_f$) of 0.9997 to 1.0000, which is a ratio ($n_z/n_f$) of a refractive index ($n_z$) in a perpendicular direction with regard to a film surface to the refractive index ($n_f$),
   (F) has a thickness in the range of from 30 to 300 μm, and
   (G) has a thickness nonuniformity in the range of from 0.1 to 1% based on an average film thickness.

2. A substrate for a liquid crystal display device which is free of halogen containing solvent, formed of the optically isotropic film as recited in claim 1.

3. An optically anisotropic, uniaxially oriented film of an aromatic polyethersulfone which is free of halogen containing solvent, which
   (A) comprises an aromatic polyethersulfone,
   (B) has a transmittance to visible light at a wavelength of 550 nm in the range of from 86 to 91%,
   (C) has a haze value in the range of from 0.1 to 1%,
   (D) shows a refractive index difference (Δn) in the range of from 0.0013 to 0.0230, which is a difference between a refractive index ($n_s$) in the slow axis direction in an in-plane area of the film and a refractive index ($n_f$) in the fast axis direction in the in-plane area,
   (F) has a thickness in the range of from 30 to 300 μm, and
   (G) having a thickness nonuniformity in the range of from 0.1 to 1% based on an average film thickness.

4. A phase difference plate for a liquid crystal display device which is free of halogen containing solvent, formed of the optically anisotropic, uniaxially oriented film of claim 3.

5. The film of claim 3 which is free of halogen containing solvent, wherein the film has a phase difference (Re) in the range of from 400 to 700 nm at a wavelength of 590 nm and has a phase difference nonuniformity in the range of 0.01 to 2% of a phase difference.

6. A substrate for a liquid crystal display device which is free of halogen containing solvent and containing thereon the optically isotropic film of claim 1.

7. A phase difference plate which is free of halogen containing solvent for a liquid crystal display device comprising the optically anisotropic, uniaxially oriented film of claim 3.

* * * * *